(12) United States Patent
De Vaan

(10) Patent No.: US 9,733,407 B2
(45) Date of Patent: Aug. 15, 2017

(54) LIGHT EMITTING ARRANGEMENT USING LIGHT GUIDES

(71) Applicant: PHILIPS LIGHTING HOLDING B.V., Eindhoven (NL)

(72) Inventor: Adrianus Johannes Stephanus Maria De Vaan, 'S-Hertogenbosch (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 0 days.

(21) Appl. No.: 14/649,233

(22) PCT Filed: Nov. 6, 2013

(86) PCT No.: PCT/IB2013/059926
§ 371 (c)(1),
(2) Date: Jun. 3, 2015

(87) PCT Pub. No.: WO2014/087278
PCT Pub. Date: Jun. 12, 2014

(65) Prior Publication Data
US 2015/0355398 A1    Dec. 10, 2015

Related U.S. Application Data

(60) Provisional application No. 61/732,594, filed on Dec. 3, 2012.

(51) Int. Cl.
*F21V 8/00*       (2006.01)
*F21V 23/00*      (2015.01)
*F21Y 115/10*     (2016.01)

(52) U.S. Cl.
CPC .......... *G02B 6/0001* (2013.01); *F21V 23/003* (2013.01); *F21V 23/005* (2013.01);
(Continued)

(58) Field of Classification Search
CPC .. G02B 6/0023; G02B 6/0013; G02B 6/0001; F21V 7/00; F21V 13/04; F21V 7/041
(Continued)

(56) References Cited

U.S. PATENT DOCUMENTS 7,354,179 B2    4/2008  Huang et al.
7,399,107 B2    7/2008  Chan
(Continued)

FOREIGN PATENT DOCUMENTS

CN    101922638 A    12/2010
JP    2000307807 A   11/2000
JP    2010004077 A    1/2010

*Primary Examiner* — Karabi Guharay

(57) ABSTRACT

A light emitting arrangement comprising two light emitting elements (32, 32*a*) arranged along a longitudinal direction of the light emitting arrangement, and at least one light guide (34) each partly covering the light emitting surface of a first of the light emitting elements and having an entrance surface (35) arranged to receive incident light from the first light emitting element (32) and an exit surface (36) arranged to emit at least a portion of the incident light received by the entrance surface. The light guide is arranged such that the exit surface (36) is located between the first light emitting element (32) and a second light emitting element (32*a*) and is oriented to emit light in the general lighting direction. The light guide will distribute light emitted by the first light emitting element to more than one location, as if it was emitted of several weaker light emitting elements.

19 Claims, 5 Drawing Sheets

(52) U.S. Cl.
CPC ......... *G02B 6/0018* (2013.01); *G02B 6/0078* (2013.01); *F21Y 2115/10* (2016.08); *G02B 6/0073* (2013.01)

(58) Field of Classification Search
USPC .................................................. 362/217.01
See application file for complete search history.

(56) References Cited

U.S. PATENT DOCUMENTS

| | | |
|---|---|---|
| 7,399,995 B2 | 7/2008 | Yu |
| 7,766,533 B2 | 8/2010 | Liu et al. |
| 8,657,467 B2* | 2/2014 | Hsieh .................... F21V 7/0091 362/240 |
| 2006/0007704 A1 | 1/2006 | Mori et al. |
| 2007/0253216 A1 | 11/2007 | Watanabe |
| 2007/0268722 A1* | 11/2007 | Ohkawa .................... F21V 5/04 362/623 |
| 2009/0296017 A1* | 12/2009 | Itoh ...................... G02B 6/0023 349/61 |
| 2010/0220469 A1* | 9/2010 | Ivey .......................... F21K 9/17 362/218 |
| 2012/0074440 A1 | 3/2012 | Yokota |
| 2012/0106144 A1 | 5/2012 | Chang |
| 2012/0127754 A1 | 5/2012 | Lin et al. |
| 2012/0140481 A1 | 6/2012 | Simchak et al. |

* cited by examiner

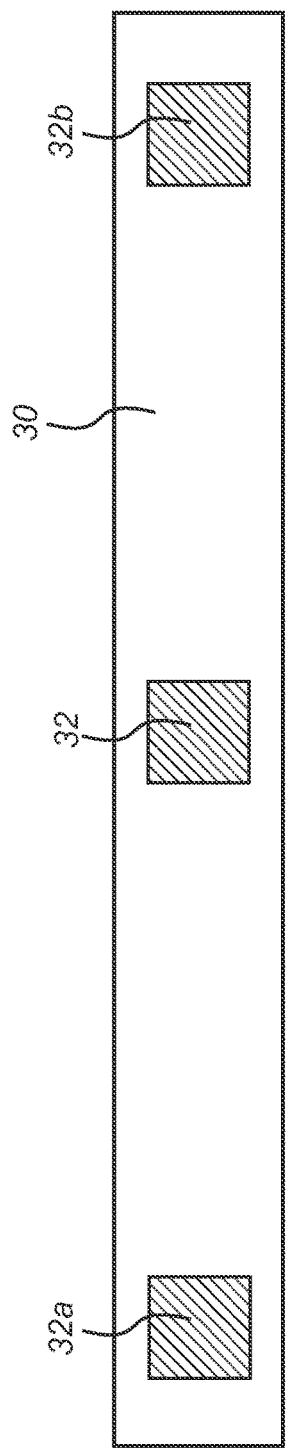
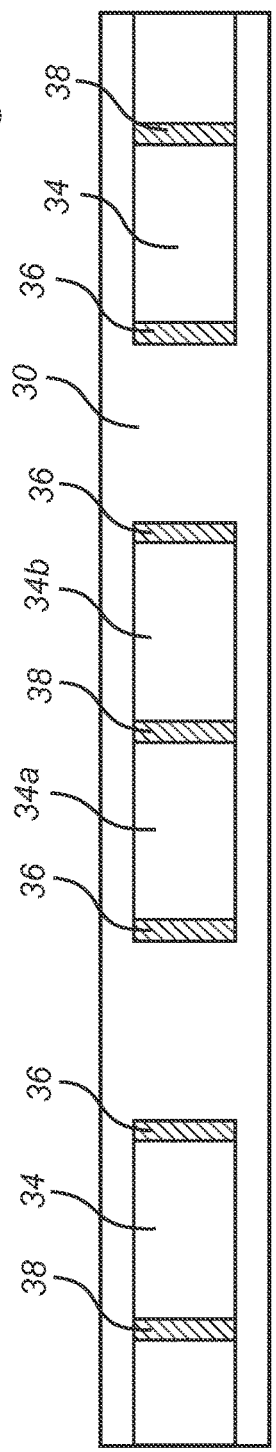
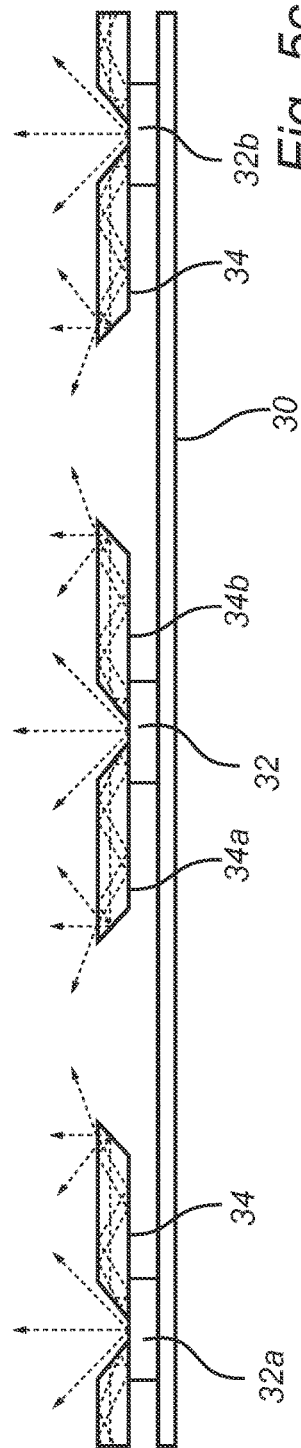
Fig. 5a
Fig. 5b
Fig. 5c

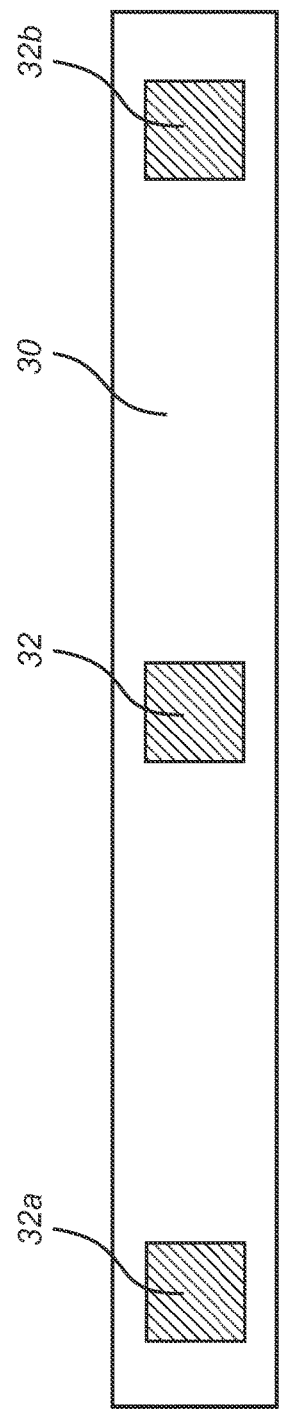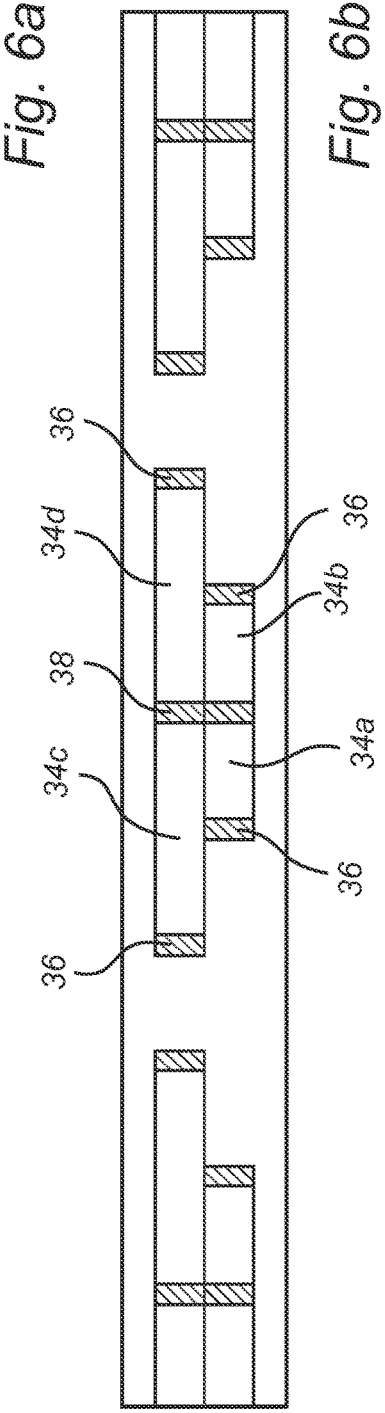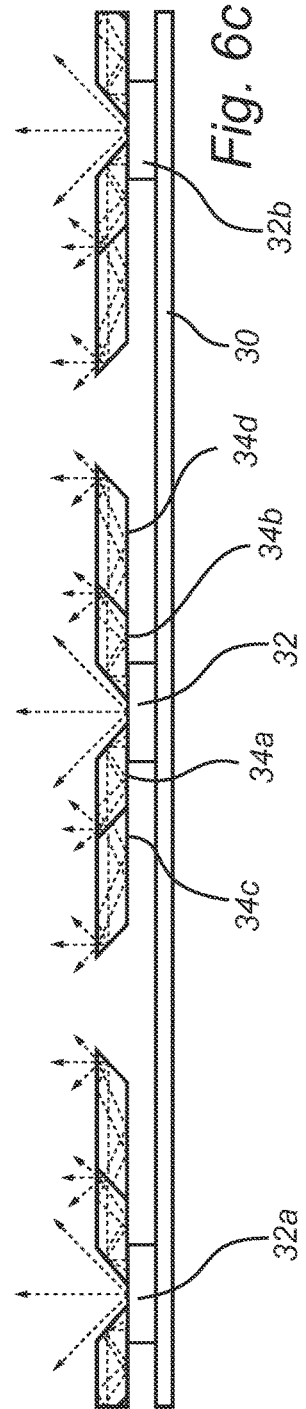

LIGHT EMITTING ARRANGEMENT USING LIGHT GUIDES

CROSS-REFERENCE TO PRIOR APPLICATIONS

This application is the U.S. National Phase application under 35 U.S.C. §371 of International Application No. PCT/IB13/059926, filed on Nov. 6, 2013, which claims the benefit of U.S. Provisional Patent Application No. 61/732, 594, filed on Dec. 3, 2012. These applications are hereby incorporated by reference herein.

FIELD OF THE INVENTION

The present invention relates to the field of lighting, and more specifically to a light emitting arrangement using light guides.

BACKGROUND OF THE INVENTION

A T-LED (Tube LED) is an LED based illumination device, where the LEDs are positioned as a linear lighting system in such way that the LEDs are carried by a mechanical carrier that can easily be mounted like a fluorescent tube in an office luminaire or similar. It is advantageous if the T-LED emits light uniformly. In current T-LEDs, the uniformity may be achieved by surrounding the LED board with a diffuser. A disadvantage of the diffuser solution is that the part of the light that is scattered back from the diffuser towards the LEDs requires multiple reflections before it can leave the T-LED towards the room, which reduces the system efficiency.

FIG. 1a shows a view from above of a light emitting arrangement comprising three light emitting elements, e.g. LEDs, 10a-c mounted on a PCB 16. FIG. 1b shows how the light emitting elements 10a-c emits a light 14. The light 14 emitted by this light emitting arrangement may be perceived as spottiness by an observer of the system since only three distinct light spots will be seen. Such an arrangement may be annoying for the observer. A solution to this problem would be to increase the number of light emitting elements 10a-c mounted on the PCB 16. This would lead to increased cost for the system which is not desirable. A further solution is to install the PCB and the light emitting elements 10a-c in a transparent tube 22 with an inner surface 220 made diffusing, as visualized in FIG. 2. A portion 20a, 20b of the light 14 emitted by the light emitting elements 10a-c is scattered back by the diffusing inside 220 of the diffuser 22 towards the PCB 16 where it is scattered back again to illuminate the diffuser 22 (indicated by 21a, 21b). As a result, a more homogeneous illumination is obtained at the diffusers level. Part of the light penetrating the diffuser 22 is scattered forward 18 by the diffusing inside 220 and consequently spread out leading to a more homogeneous illumination as perceived by the observer.

A disadvantage is that the part of the light that is scattered back 20a-b from the diffuser 22 towards the PCB 16 requires additional reflections before it can leave the light emitting arrangement towards for example a room. Since each reflection will result in some absorption, the system efficiency is reduced. Current T-LED systems, e.g. as described in FIG. 2, typically have 90% light efficiency, 10% light loss, while the spottiness is on the limit of acceptability, and for some people failing their acceptability level.

US20120106144 proposes a LED tube lamp that includes a heat sink, a LED substrate, a pair of connectors, and a cover fixed to the heat sink. The cover includes a first cover and a second cover, at least one optical lens is arranged on the first cover, the at least one optical lens comprises a concave lens and reflective lenses arranged on both sides of the concave lens. The concave lens is configured to refract light beams from the LEDs in a forward direction or in an approximate forward direction, and the reflective lenses are configured to reflect light beams from the LEDs in a lateral direction.

SUMMARY OF THE INVENTION

In view of the above, an objective of the invention is to solve or at least reduce one or several of the drawbacks discussed above. Generally, the above objective is achieved by the attached independent patent claims.

According to a first aspect of the invention, this and other objects are achieved by a light emitting arrangement comprising two light emitting elements arranged along a longitudinal direction of the light emitting arrangement, each light emitting element having a light emitting surface arranged to emit light in a general lighting direction, at least one light guide partly covering the light emitting surface of a first of the light emitting elements, the light guide having an entrance surface arranged to receive incident light from the first light emitting element, and an exit surface arranged to emit at least a portion of the incident light received by the entrance surface, the light guide being arranged such that the entrance surface is located to receive light emitted from one of the light emitting elements, and the exit surface is located in between the light emitting elements and is arranged to emit light in the general lighting direction.

The expression "general lighting direction" relates to the direction in which a majority of light is emitted from the light emitting elements. Typically, this direction is normal to the surface of a substrate on which the light emitting elements are mounted.

The present invention is based on the idea of providing a light emitting arrangement where light guides are used for guiding a part of the light emitted by a light emitting element to a position in between the light emitting elements. This will redistribute the light emitted by one light emitting element to several locations (the uncovered portion of the light emitting surface and the exit surface(s) of the light guide(s)), as if it was emitted from several weaker light emitting elements. An advantage is that this reduces the spottiness of the light emitting arrangement. This means that the arrangement is perceived as an arrangement that contains more light emitting elements of a lower intensity, and as such is emitting more evenly spread light than if each light emitting element was just emitting its light at one general position. This may further be advantageous since one powerful light emitting element may be cheaper than several less powerful light emitting elements. This may also lead to a more time efficient production of the light emitting arrangement leading to a reduced production cost. A further advantage may be that the number of light emitting elements included in the light emitting arrangement can be reduced without increasing the spottiness of the arrangement. This leads to a lower number of light emitting elements and as a consequence fewer electrical interfaces. This leads not only to cost reductions for the material of the light emitting arrangement but also to a reduced production cost due to a more time efficient production of the light emitting arrangement.

It is noted that a position "in between the light emitting elements" is not limited to a position on a straight line between the light emitting elements. On the contrary, a broader meaning is intended, including any position generally between the light emitting elements in the longitudinal direction.

The term "light emitting element" is used to define any device that emits radiation in any region or combination of regions of the electromagnetic spectrum for example, the visible region, infrared and/or ultraviolet region, when activated e.g. by applying a potential difference across it or passing a current through it. Therefore a light emitting element can have monochromatic, quasi-monochromatic, polychromatic or broadband spectral emission characteristics. Each light emitting element has at least one light source. Examples of light sources include semiconductor, organic, or polymer/polymeric light emitting diodes, optically pumped phosphor coated light emitting diodes, optically pumped nano-crystal light emitting diodes or any other similar devices as would be readily understood by a person skilled in the art. Furthermore, the term light emitting element can be used to define a combination of the specific light source that emits the radiation in combination with a housing or package within which the specific light source or light sources are placed.

The light received by the light guide may be parallel displaced along the longitudinal direction of the light emitting arrangement before leaving the exit surface. This may increase the system efficiency since the light guides redistributes the light with hardly any light losses, while the solution using a diffuser requires extra reflection that do cause light losses. This may also increase the uniformity of the light emitted by the light emitting arrangement since the light emitting arrangement is perceived as having a greater number of light emitting elements. In a further embodiment, light may be displaced in another direction, if this is required by the arrangement. This may also be the case if the light emitting arrangement is not completely straight in a longitudinal direction, it may e.g. be curved.

The exit surfaces of the light guides may be diffusing, such that light exiting the light guide through the exit surface is more uniformly distributed. Alternatively, a diffusing element may be arranged in front of the light emitting elements.

In a further embodiment, the light emitting arrangement may comprise an array of light emitting elements, and a plurality of light guides arranged such that the exit surface of the at least one light guide is positioned between each pair of adjacent light emitting elements. An advantage of having more light emitting elements is that more light may be emitted by the arrangement. The light emitting elements may extend along one general direction or it may extend in two directions. In the latter case, one may talk about having several light emitting arrangements placed beside each other.

The light emitting elements in the array of light emitting elements may be equally distanced from each other, or may be arranged in a repeating pattern. An advantage of such distribution is that the uniformity of the emitted light is increased. A further advantage may be that the production of the arrangement is simplified. For example, a module with a number of light emitting elements and light guides may be manufactured, and several such modules may be combined to form a lighting arrangement.

According to another embodiment of the present invention, the light emitting arrangement has a first and a second light guide arranged to receive light from a first light emitting element, the first light emitting element positioned in between a second and a third light emitting element, wherein the exit surface of the first light guide is located between the first and the second light emitting element, and the exit surface of the second light guide is located between the first and the third light emitting element. In this embodiment, the first light emitting element generates three spots of light, one spot of light is generated between the second and the first light emitting element, one spot of light is generated between the first and the third light emitting element and one spot of light is generated by the remaining uncovered part of the light emitting element. The entrance surface of the first and the second light guides may cover ⅓ of the first light emitting element each, or some other fraction depending on the properties of the light guide, e.g. the light-transmitting efficiency of the light guide. It may be advantageously if each spot of light generated by a light emitting element appears equally bright from an observer's perspective. This may lead to a more uniform light emitted by the arrangement.

In a further embodiment, a third and a fourth light guide is arranged to receive light from the first light emitting element, wherein the exit surface of the third light guide is located between the first and the second light emitting element, the exit surface of the fourth light guide is located between the first and the third light emitting element, the exit surface of the first light guide is positioned closer to the first light emitting element than the exit surface of the third light guide, the exit surface of the second light guide is positioned closer to the first light emitting element than the exit surface of the fourth light guide.

According to a further embodiment of the present invention, the light guide, in cross-section along the longitudinal direction of the light emitting arrangement, is shaped as a parallelogram, with its parallel sides extending along the longitudinal direction. This geometric design may be an efficient way to enable in-coupling and out-coupling of light in the longitudinally separated ends of the light guide, while enabling efficient guiding of light there between.

According to another embodiment of the present invention, a cross section along the longitudinal axis of the light emitting arrangement of the exit surface of the light guide and a cross section along the longitudinal axis of the light emitting arrangement of an uncovered part of the first light emitting element have equal size. Two effects of this are: (1) an equal amount of light is emitted from the uncovered part of the light emitting element and the exit surface of the light guide and (2) the light distribution of the light beam remains unchanged while the light passes through such a light guide. An effect of this may be that the light emitted by the light emitting arrangement is uniformly spread along the arrangement. Depending on the properties and requirements of the arrangement, the dimensions may vary. For example, if the material of the light guide has a 98% light efficiency, the dimension of the entrance surface may have an equally larger size to compensate for the light loss through the light guide.

The light emitting elements of the light emitting arrangement may be mounted on a reflecting surface. An effect of this may be that any light reflected towards the surface may be re-reflected in the general lighting direction again. Thus, a more efficient light emitting arrangement may be achieved.

One or several light emitting arrangement according to the present invention may be implemented in an illumination system. One example could be a T-LED system, further comprising a transparent plastic tube, the transparent plastic tube being diffusing on an inside, and the illumination system being surrounded by the transparent plastic tube.

An advantage of having an illumination system that emits more spots of light, according to the first aspect of the present invention, as compared to having a system that emits fewer spots is that the transmission of the diffusing inside of the transparent plastic tube may be higher in the case of more spots and still result in a more homogeneous illumination.

It is noted that the invention relates to all possible combinations of features recited in the claims. Generally, all terms used in the claims are to be interpreted according to their ordinary meaning in the technical field unless explicitly defined otherwise herein.

Other objectives, features and advantages of the present invention will appear from the following detailed disclosure as well as from the drawings.

BRIEF DESCRIPTION OF THE DRAWINGS

This and other aspects of the present invention will now be described in more detail, with reference to the appended drawings showing embodiment(s) of the invention.

FIGS. 5a-c are side and top views of a light emitting arrangement without and with light guides according to embodiments of the invention.

FIGS. 6a-c are side and top views of a light emitting arrangement without and with the light guides according to embodiments of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 3:
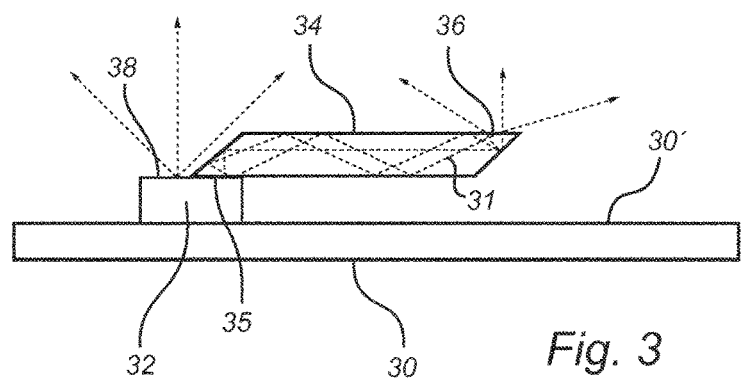
FIG. 3 is a side view of the light emitting arrangement according to a first embodiment of the invention.

FIG. 3 shows a light emitting arrangement comprising a light emitting element 32 mounted on a PCB 30. The PCB may have a reflective surface 30' for reflecting any light incident on the PCB, like any light rays originating from the light emitting element 32 directed onto the PCB. Since most times there are optical structures between the light emitting elements and the area to be illuminated there are light reflections from these optical structures towards the PCB structures instead to the area to be illuminated. Most times these optical structures are part of the light emitting arrangement and are as such close to the PCB. Due to the reflective surface 30' of the PCB, this light is bounced back towards the area to be illuminated, and as such the light efficiency of the light emitting arrangement is increased. The reflecting surface 30' may be achieved by painting the PCB surface white or in any other suitable way.

The arrangement further includes a light guide 34. A light guide is a transparent or translucent element which is configured to guide light through the light guide by e.g. internal reflection of the light at most of its boundaries due to total internal reflections of the light rays in the beam. Since such a light guide hardly absorbs any of the light guided through it, the solution can be made nearly lossless. The light guide 34 has an entrance surface 35 arranged to receive incident light and an exit surface 36 arranged emit light that has passed through the light guide.

The light guide may be in optical contact with the light emitting element. By this is meant that the high refraction medium of the light guide comes in direct contact with the optics of the light emitting element, or in other words no air gap exists between these two components. In this way light transfer from the light emitting element to the light guide will not suffer from Fresnel reflection with air interfaces, or at least suffer less from Fresnel reflections, depending on the refraction indexes of the optics of the light emitting element and the light guide. It is noted that it is also possible that there is a gap between the light emitting element and the light guide.

The light guide 34 can be made from a transparent material, preferably having a very low degree of light absorption, such as glass or a plastic material. A suitable material may be a polymethylmethacrylate (PMMA) plate. Other material such as acrylic resin, polycarbonate, epoxies, and glass are equally possible materials.

To increase the light capturing in the light guide, the outer surface of the light guide, or parts of it, can be highly reflective and manufactured from aluminum, protectively coated aluminum, silver, protective coated silver, reflectively coated plastic material, a multilayer plastic reflective material for example 3M Vicuity™ foil, or the like, as would be readily understood by a person skilled in the art. However, this is not a critical requirement. Also a light guide without the reflective layers will deliver improvements as described above since the total inner reflection properties of the light guide are enough for efficiently guiding the light from the entrance surface 35 to the exit surface 36.

In some embodiments of the present invention, the exit surface 36 is covered by a diffusing material for spreading, e.g. scattering, the light emitted by the light guide even more, and in a similar way as the light is emitted by the light emitting element. The diffusing properties of the diffusing material may vary depending on the requirements of the arrangement. The properties may e.g. be surface roughness of the material and/or fine particles contained in the material itself that diffuses light passing through the material. The material can be made of transparent resin or some other suitable material. Alternatively, diffusive properties are achieved by moulding in small prisms, or other surface structures, in the light guide material itself.

The light guide 34 is arranged such that the entrance surface 35 partly overlaps the light emitting surface of the light emitting element 32 and is adapted to receive light emitted from the light emitting element 32. Light emitted from the light emitting element is guided through the light guide 34 and exited at a position away from the light emitting element 32. The part of the light emitting element not covered by the light guide 34a still emits light in an ordinary way.

Figure 1A:
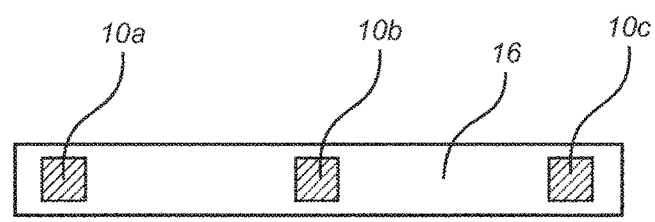
FIGS. 1a and 1b are side and top views of a conventional light emitting arrangement.
Figure 1B:
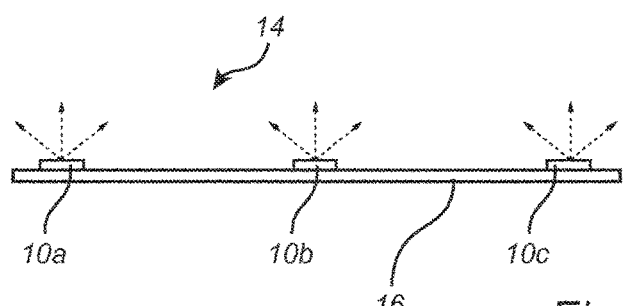
Figure 2:
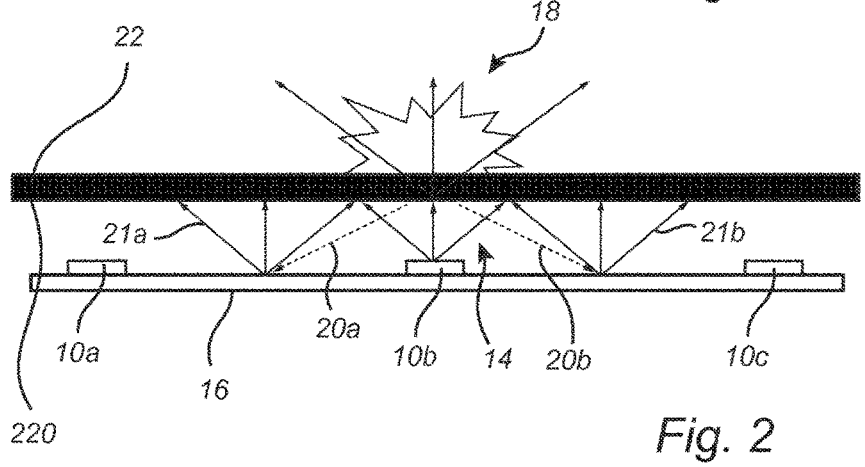
FIG. 2 is a side view of the light emitting arrangement of FIG. 1 with a diffuser spreading the light emitted from the light emitting elements.

In one embodiment, half of the light emitting surface of the light emitting element 32 is covered by the light guide 34, while the uncovered portion 38 emits light. The arrangement in FIG. 3 thus produces two light spots (one in the exit surface 36 and one in the uncovered portion 38) from one light emitting element 32. This means that the number of light emitting elements can be reduced with a factor two compared to the light emitting arrangement shown in FIG. 2 and still achieves the same spottiness with the same level of transmission of the diffuser. Alternatively, the number of light emitting elements could be kept and the level of transmission of the diffuser could be increased to achieve higher system efficiency. A third alternative is to keep the number of light emitting elements and the level of transmission of the diffuser and thus achieve reduced spottiness of the system. These three alternatives may of course be combined.

In the illustrated case, the light guide has a cross section in the shape of a parallelogram, i.e. it has a top and bottom surface parallel to the PCB 30, and two slanted end surfaces that serve to in-couple light and out-couple light, respectively. The shape of the side surfaces (i.e. the surfaces substantially parallel to the plane of the drawing) may have any form that promotes internal reflection and prevents out-coupling of light. In this example, the entrance surface 35 will be the portion of the bottom surface overlapping the light emitting element 32. The exit surface 36 will be a portion of the top surface.

As an alternative, the exit surface 36 may form an angle with the PCB surface, in order to direct light in a different general direction.

Figure 4:
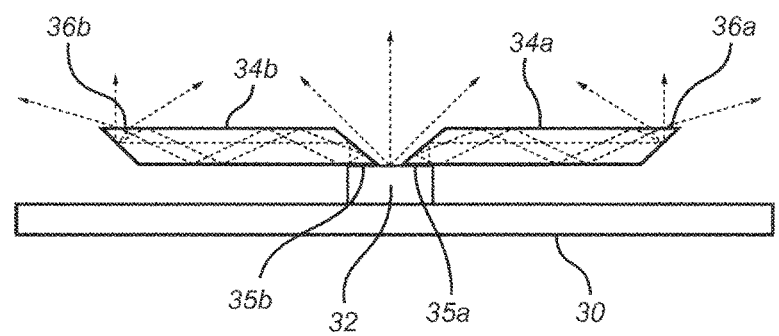
FIG. 4 is a side view of the light emitting arrangement according to a second embodiment of the invention.

With reference to FIG. 4, the light emitting element 32 is partly covered by two light guides 34a, 34b, each having an entrance surface 35a, 35b, and an exit surface 36a, 36b. Light emitted by one light emitting element 32 will thus be emitted in three different positions (the two exit surfaces 36a, 36b, as well as the non-covered portion 38 of the light emitting element 32). This means, as discussed above, that the number of light emitting elements could be reduced with a factor three with the same amount of spottiness.

FIG. 5a shows, in a view from above, a light emitting arrangement comprising three light emitting elements 32, 32a, 32b mounted on a PCB 30. The light emitting elements 32a-c are not covered by any light guides and thus only three distinct light spots can be seen.

FIG. 5b and FIG. 5c show, in a view from above and from the side, respectively, how the each light emitting element 32, 32a, 32b is covered by two light guides 34, 34a, 34b. As explained with reference to FIG. 4, each light guide will guide a portion of the light originating from a light emitting element to an exit surface 36 located in between neighboring light emitting elements. Just like in FIG. 4, the number of light spots is thus multiplied with three compared to the light spots in FIG. 5a.

To further improve the homogeneousness of the illumination of the arrangement, the distance between each light spot is equal in the example in FIG. 5b. The areas of the light spots (i.e. the exit surfaces 36 and the uncovered portions 38 of the light emitting elements) are here substantially equal which may further improve the homogeneousness of the illumination of the arrangement.

The arrangement shown in FIG. 5b-c may lead to higher system efficiency and/or reduced spottiness and/or reduced number of required light emitting elements as described above.

FIGS. 6a-c illustrate a further light emitting arrangement without and with the light guides according to further embodiments. FIG. 6a shows, in a view from above, a light emitting arrangement comprising three light emitting elements 32, 32a, 32b mounted on a PCB 30. To simplify the description, only one light emitting element 32 is described in FIGS. 6b and 6c, but the description is analogously valid for the other two light emitting elements 32a, 32b.

As can be seen in FIG. 6b-c, in a view from above and a side view, respectively, the light emitting element 32 is partly covered by four light guides 34a-d, each guiding a fraction of the light emitted by the light emitting element 32 to four exit surfaces 36. Two of the light guides are arranged on each side of the light emitting element 32, and have different length. Thereby, there will be five spots of light (the uncovered surface 38 of the light emitting element 32, and the four exit surfaces 36) which are distributed along in longitudinal direction. Light guides on the same side of the light emitting element 32, may be positioned beside or adjacent to each other in a direction perpendicular to the longitudinal direction of the light emitting arrangement (as indicated in FIG. 6b), or may be positioned on top of each other (not shown).

The number of light spots is thus multiplied with five which can lead to both a more homogenous illumination emitted from the arrangement and to achieve higher system efficiency as discussed above. To further improve the homogeneousness of the illumination of the arrangement, the distance between each light spot in the longitudinal direction can be equal, as in the example in FIG. 6b. Further, the entrance surface of each light guide 34a-d may cover approximately ⅕ of the light emitting element 32, such that each light spot emits essentially the same amount of light. Depending on the light-transmitting efficiency of the light guide, the area of the uncovered surface 38 of the light emitting element should be smaller than the entrance surfaces of each light emitting element.

Figure 7:
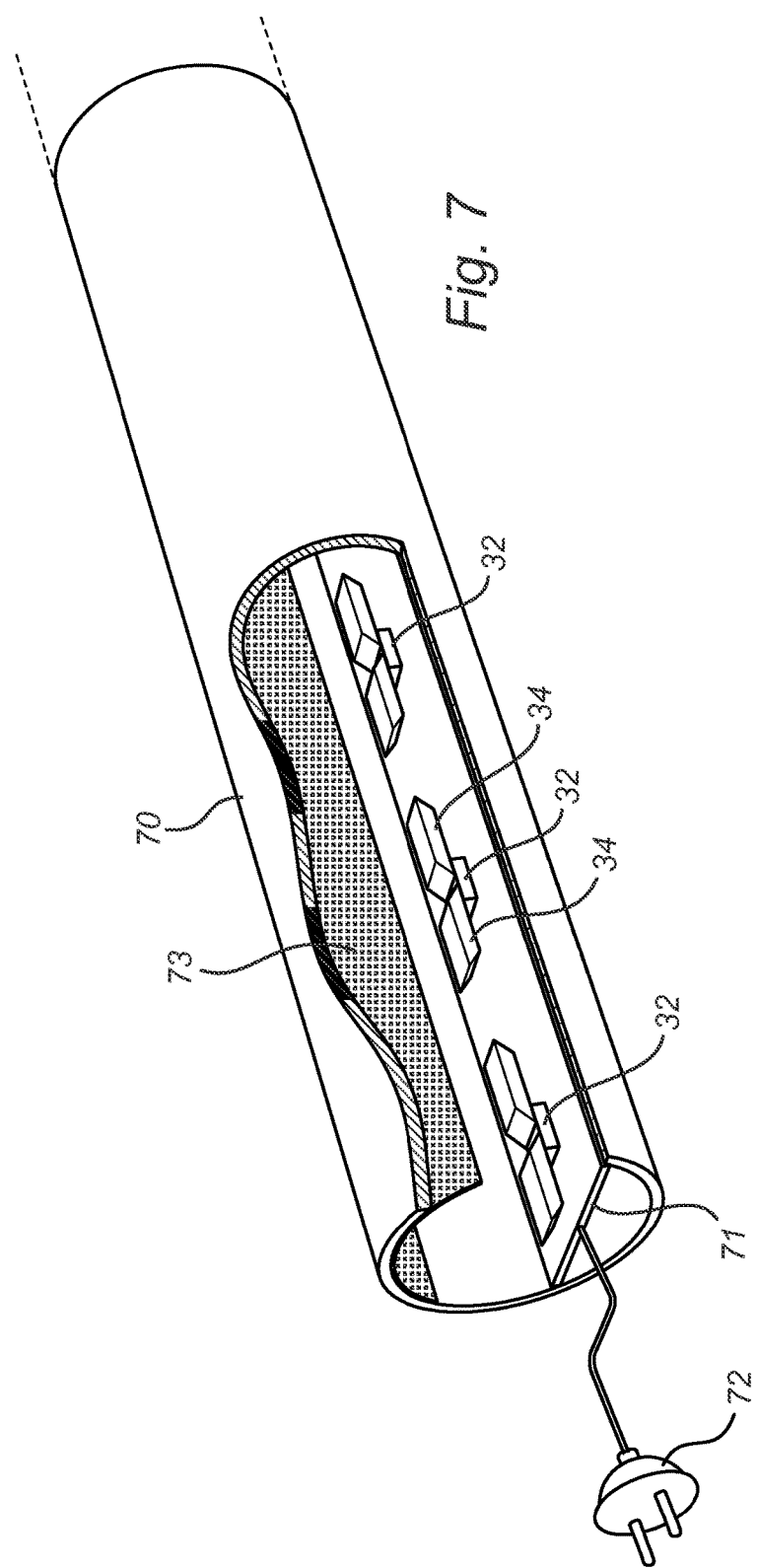
FIG. 7 is a perspective view of a T-LED system in cross section according to embodiments.

FIG. 7 illustrates a T-LED system in cross section according to embodiments of the present invention. The system comprises a transparent tube 70, e.g. made of plastic or glass, in which is arranged a PCB 71 supporting a plurality of light emitting element, e.g. LEDs 32. Light guides 34 are arranged to partly cover the LEDs 32, as discussed with reference to FIGS. 3-6. The PCB further comprises driver circuitry connected to a power interface 72, for driving the LEDs 32.

A diffusing element 73 is arranged inside the tube 70, such that any light emitted by the LEDs 32 or the light guides 34 will pass through the diffusing element 73. The diffusing element 72 may be a diffusing sheet inserted between the tube 70 and the PCB 71. Alternatively, the inner or outer surface of the tube 70 may be diffusive. This can be achieved by surface structuring or a diffuser laminated to the tube. Yet another option is to make the tube 70 of a diffusing material.

The person skilled in the art realizes that the present invention by no means is limited to the preferred embodiments described above. On the contrary, many modifications and variations are possible within the scope of the appended claims. For example, the shape of the light guide shown in the figures is just exemplary. The light guide near the entrance surface could for example be shaped as a quarter of a sphere or formed as a constant angle curve.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light emitting arrangement comprising:
   at least one light emitting element having a light emitting surface arranged to emit light in a general lighting direction,
   at least one light guide partly covering the light emitting surface, said light guide having an entrance surface arranged to receive incident light from a portion of the light emitting surface and an exit surface arranged to emit at least a portion of the incident light received by the entrance surface, wherein the entrance surface and the exit surface are parallel,
   wherein the entrance surface of the light guide is in contact with said portion of the light emitting surface,
   wherein the exit surface is oriented to emit light in the general lighting direction, and
   wherein the light guide has a cross-section along a longitudinal direction of the light emitting arrangement in the form of a parallelogram, wherein the entrance surface and the exit surface of the light guide are opposite sides of the parallelogram.

2. The light emitting arrangement according to claim 1, wherein light received by the light guide is parallel displaced when leaving the exit surface.

3. The light emitting arrangement according to claim 1, wherein the exit surface comprises a diffusive element.

4. The light emitting arrangement according to claim 1, comprising an array of light emitting elements, and a plurality of light guides arranged such that an exit surface of one of the light guides is positioned between two neighboring ones of said array of light emitting elements.

5. The light emitting arrangement according to claim 4, wherein the light emitting elements are equally distanced from each other.

6. The light-emitting arrangement according to claim 4, wherein the light emitting elements are arranged in a repeating pattern.

7. The light emitting arrangement according to claim 1, wherein said at least one light guide comprises a first light guide and a second light guide, each of the first and second light guides partly covering a respective portion of the light emitting surface and arranged to receive light from said respective portion of the light emitting surface,
   wherein each of said first and second light guides has an entrance surface arranged to receive incident light from said respective portion of the light emitting surface, and an exit surface arranged to emit at least a portion of the incident light received by the entrance surface, and
   wherein the light emitting surface is located between the exit surface of the first light guide and the exit surface of the second light guide.

8. The light emitting arrangement according to claim 1, the light guide further having:
   a top surface facing the same direction as the general lighting direction,
   a bottom surface arranged opposite to the top surface, wherein
   the entrance surface is a part of the bottom surface, and
   the exit surface is a part of the top surface.

9. The light emitting arrangement according to claim 1, wherein an area of the exit surface and an area of an uncovered portion of the light emitting surface are substantially equal in size.

10. The light emitting arrangement according to claim 1, wherein the light emitting element is mounted on a reflecting surface.

11. The light emitting arrangement according to claim 1, further comprising a diffusing element arranged in front of the light emitting element.

12. An illumination system comprising at least one light emitting arrangement according to claim 1, a driver circuitry for driving the light emitting arrangement, and a power interface connected to the driver circuitry.

13. A T-LED system comprising an illumination system according to claim 12, further comprising a transparent tube surrounding the light emitting arrangement, and a diffusing element proximate the transparent tube.

14. A light emitting arrangement comprising:
   a light emitting element having a light emitting surface, the light emitting surface being arranged to emit light in a general lighting direction;
   first and second light guides, each of the first and second light guides partly covering a respective portion of the light emitting surface and arranged to receive light from said respective portion of the light emitting surface, wherein each of said first and second light guides has an entrance surface arranged to receive incident light from said respective portion of the first light emitting surface, and an exit surface arranged to emit at least a portion of the received incident light;
   third and fourth light guides, each of the third and fourth light guides partly covering a respective portion of the light emitting surface and arranged to receive light from said respective portion of the light emitting surface, wherein each of said third and fourth light guides has an entrance surface arranged to receive incident light from the light emitting surface, and an exit surface arranged to emit at least a portion of the received incident light,
   wherein the exit surface of the first light guide is positioned closer to the light emitting surface than the exit surface of the third light guide, and the exit surface of the second light guide is positioned closer to the light emitting surface than the exit surface of the fourth light guide.

15. The light emitting arrangement of claim 14, wherein the entrance surfaces of the first, second, third, and fourth light guides are in contact with said respective portions of the light emitting surface.

16. The light emitting arrangement of claim 14, wherein the light emitting surface is located between the exit surfaces of the first and second light guides and between the exit surfaces of the third and fourth light guides.

17. A light emitting arrangement comprising:
   a first light emitting element having a first light emitting surface;
   a second light emitting element having a second light emitting surface, wherein the first and second light emitting elements are arranged along a longitudinal direction of the light emitting arrangement, and wherein the first and second light emitting surfaces are arranged to emit light in a general lighting direction;
   first and second light guides, each of the first and second light guides partly covering a respective portion of the first light emitting surface and arranged to receive light from said respective portion of the first light emitting surface, wherein each of said first and second light guides has an entrance surface arranged to receive incident light from said respective portion of the first light emitting surface, and an exit surface arranged to emit at least a portion of the incident light received by the entrance surface;

third and fourth light guides, each of the third and fourth light guides partly covering a respective portion of the second light emitting surface and arranged to receive light from said respective portion of the second light emitting surface, wherein each of said third and fourth light guides has an entrance surface arranged to receive incident light from said second light emitting surface, and an exit surface arranged to emit at least a portion of the incident light received by the entrance surface;

wherein the exit surfaces of the first, second, third, and fourth light guides are arranged along the longitudinal direction of the light emitting arrangement; and wherein each of the first, second, third, and fourth light guides has a cross-section along a longitudinal direction of the light emitting arrangement in the form of a parallelogram.

18. The light emitting arrangement of claim 17, wherein the entrance surfaces of the first, second, third, and fourth light guides are in contact with said respective portions of the first and second light emitting surfaces.

19. The light emitting arrangement of claim 17, wherein the exit surfaces of the second and third light guides are arranged between the first and second light emitting surfaces.

* * * * *